No. 887,852. PATENTED MAY 19, 1908.
B. C. SABIN.
PIE PAN.
APPLICATION FILED JULY 10, 1907.

UNITED STATES PATENT OFFICE.

BELLE C. SABIN, OF CHICAGO, ILLINOIS.

PIE-PAN.

No. 887,852.  Specification of Letters Patent.  Patented May 19, 1908.

Application filed July 10, 1907. Serial No. 383,123.

*To all whom it may concern:*

Be it known that I, BELLE C. SABIN, a citizen of the United States, residing at Chicago, in the county of Cook and State of Illinois, have invented certain new and useful Improvements in Pie-Pans; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to pie pans and has for its object to provide a pan in conjunction with the auxiliary rim for baking pies and the like, in such manner that the edge crusts of the pie will be thoroughly baked and which will prevent the edge crusts from coming apart and thereby allowing the juice of the pie to escape and run into the oven or between the bottom crust and the pie pan.

With this object in view my invention consists in the novel construction of the auxiliary rim and also in the combination of this rim with the pie pan.

Figure 1:
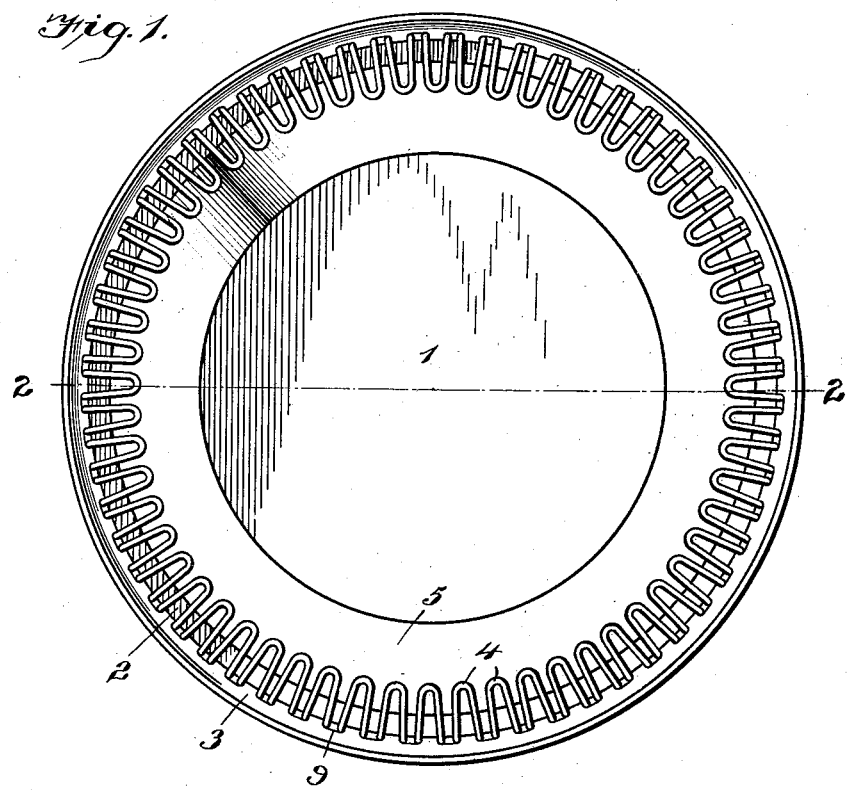
Figure 2:
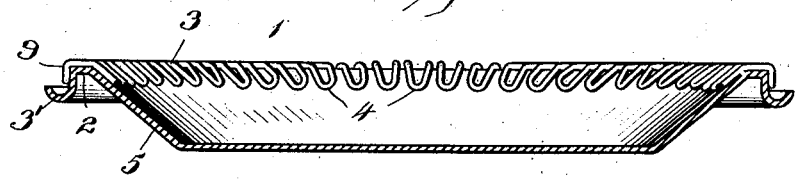
Figure 3:
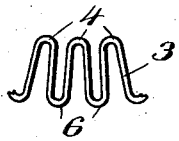
Figure 4:
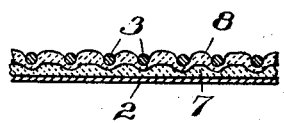
Figure 5:

Referring to the accompanying drawing: Figure 1 is a plan view of the pie pan constructed in accordance with my invention and showing the auxiliary rim in operative position. Fig. 2 is a vertical section taken on line 2—2 of Fig. 1. Fig. 3 is a fragmentary view of a section of the auxiliary rim showing same constructed of wire. Fig. 4 is a vertical sectional view taken through the rim of the pan and auxiliary rim showing the pie crusts also in section, and Fig. 5 is a fragmentary view of a section of auxiliary rim formed of sheet metal.

Like numerals of reference indicate the same parts throughout the several figures in which, 1 indicates the pie pan having the body portion shaped substantially as shown and having a flat rim 2 and a trough 3 surrounding said rim 2 and lower than said rim 2 as clearly shown in Fig. 2.

3 indicates the auxiliary rim, which as shown in Figs. 1, 2 and 3, is formed of wire bent as shown, and having the inner points 4 bent downwardly to conform to the side 5 of the pie pan and the outer points 6 bent downwardly over the edge of the rim 2 toward the trough 3 as clearly shown in Fig. 2. While this rim is preferably constructed of wire as just described it is of course evident that it may be constructed of any suitable sheet metal, providing however, that the same be very open, as an auxiliary rim having a continuous surface will not answer my requirements and I lay no claim to such a construction.

In Fig. 4, 7 indicates the lower crust of a pie and 8 the upper crust.

Having thus described the several parts of my invention its operation is as follows: The pie having been made and placed in the pan the auxiliary rim 2 is placed in position shown in Figs. 1 and 2 and forced gently so as to cause the wire of which the rim is formed to enter the upper crust 8, forcing said upper crust 8 into the lower crust 7 as shown in Fig. 4, the pie being then ready to be placed in an oven.

In cooking pies generally, and particularly those having a great deal of juice it is very common for the upper and lower crusts to separate at the edges and allow the juice and gases to escape, which juice falls upon the oven and burns creating a very disagreeable odor and oftentimes cementing the pan to the oven to such an extent that an implement has to be employed to release the pan, which operation is frequently attended with severe burns.

While this device securely holds the upper and lower crusts together during the baking operation the trough 3 also provides a receptacle for any juice which might escape between the crusts, and as the outer points 6 of the auxiliary rim are bent downwardly at 9 over the rim 2 of the pan carrying the crusts down in this position it is practically impossible for the juice to enter between the lower crust and the pan, thereby insuring a well baked and perfectly digestible lower crust.

While I have shown and described an auxiliary rim for holding the crusts I wish it to be plainly understood that the auxiliary rim must be either constructed as shown in Figs. 1 and 2 or be constructed of sheet metal, and the metal must be so cut away or open that a very small portion thereof covers the upper crust, as I have found by experience that a solid flat or continuous rim placed in this position absolutely prevents the edge crusts of the pie from baking and leaves said crust in a clammy, uncooked and indigestible state even after the rest of the pie has been thoroughly cooked.

Having thus fully described my invention what I claim as new and desire to secure by Letters Patent of the United States is:—

1. A pie pan having a trough around the outer rim thereof in combination with an auxiliary rim constructed of wire and bent to form inner and outer points, the inner points of said auxiliary rim being bent downwardly to conform to the shape of the side of the pan, and the outer points of said auxiliary rim bent downwardly into the said trough and terminating therein, said auxiliary rim being arranged to be placed over the edge crust of a pie, substantially as described.

2. As an article of manufacture, an auxiliary rim for pie pans which are provided with a trough around the outer rim thereof, said auxiliary rim having open portions or spaces therein for the purpose of leaving portions of the edge crust of a pie uncovered when the auxiliary rim is in operative position, said auxiliary rim having its inner portion bent downwardly to conform to the side of the pan and its outer portion bent downwardly to enter the trough in the pie pan and to terminate in said trough, substantially as described.

In testimony whereof, I affix my signature, in presence of two witnesses.

BELLE C. SABIN.

Witnesses:
NAOME M. CARPENTER,
BLANCHE C. HULEATTE.